US010339334B2

(12) United States Patent
Sawant et al.

(10) Patent No.: US 10,339,334 B2
(45) Date of Patent: Jul. 2, 2019

(54) AUGMENTED REALITY CAPTCHA

(71) Applicant: CA, Inc., Islandia, NY (US)

(72) Inventors: Yashwant Ramkishan Sawant, Maharastra (IN); Mohammed Mujeeb Kaladgi, Bangalore (IN); Junaid Ahmed Jameel, Bangalore (IN); Sandeep Banisetti, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 179 days.

(21) Appl. No.: 15/605,473

(22) Filed: May 25, 2017

(65) Prior Publication Data

US 2018/0341779 A1     Nov. 29, 2018

(51) Int. Cl.
| H04L 29/06 | (2006.01) |
| G06F 21/62 | (2013.01) |
| H04N 21/00 | (2011.01) |
| G06F 21/34 | (2013.01) |
| G06F 21/31 | (2013.01) |

(52) U.S. Cl.
CPC ......... *G06F 21/6218* (2013.01); *H04N 21/00* (2013.01); *G06F 21/316* (2013.01); *G06F 21/34* (2013.01); *G06F 2221/2133* (2013.01); *H04L 63/08* (2013.01); *H04L 63/083* (2013.01); *H04L 63/0838* (2013.01); *H04L 63/10* (2013.01)

(58) Field of Classification Search
CPC .... G06F 21/6218; G06F 21/316; G06F 21/34; G06F 2221/2133; H04N 21/00; H04L 63/08; H04L 63/083; H04L 63/0838; H04L 63/10
See application file for complete search history.

(56) References Cited

U.S. PATENT DOCUMENTS

| 9,007,473 B1 * | 4/2015 | Worley, III ........ H04N 21/2347 348/211.11 |
| 9,310,883 B2 * | 4/2016 | Weising .................. G09G 5/08 |
| 9,985,943 B1 * | 5/2018 | Reading ................. H04L 63/08 |

(Continued)

OTHER PUBLICATIONS

Przybylo, Jaromir, "Hand Tracking Algorithm for Augmented Reality Systems," Automatyka, 2010, Tom 14, Zeszyd 3/1, Institute of Automatics, ACH University of Science and Technology, Krakow, Poland, 2010 (9 pages).

(Continued)

*Primary Examiner* — Ghodrat Jamshidi
(74) *Attorney, Agent, or Firm* — Alliance IP, LLC (57) ABSTRACT

Aspects of the embodiments are directed to an augmented reality Completely Automated Public Turing test to tell Computers and Humans Apart ("captcha"). Upon determining that a user, operating a user device, is attempting to access a website, a host server can cause a camera on the user device to activate and begin streaming and image feed to the host device across a network. The host device can determine an appropriate augmentation to the image feed that is germane to the context and/or environment of what is being displayed in the image feed. The augmentation can be displayed to the user on a display of the user device. The augmentation can also include a prompt instructing the user how to interact with the augmentation. The host server can determine whether to grant the user access based on the user's interaction with the augmentation.

22 Claims, 9 Drawing Sheets

(56) References Cited

U.S. PATENT DOCUMENTS

| | | | | |
|---|---|---|---|---|
| 10,134,084 B1* | 11/2018 | Gabriele | ............ | G06Q 30/0643 |
| 2011/0242134 A1* | 10/2011 | Miller | .................. | G06T 19/006 |
| | | | | 345/633 |
| 2013/0044055 A1* | 2/2013 | Karmarkar | .............. | G06F 3/013 |
| | | | | 345/158 |
| 2013/0139248 A1* | 5/2013 | Rhee | ..................... | G06F 3/0346 |
| | | | | 726/19 |
| 2015/0338915 A1* | 11/2015 | Publicover | ........... | G06K 9/0061 |
| | | | | 345/633 |
| 2016/0371476 A1* | 12/2016 | Turgeman | ............. | G06F 21/316 |
| 2017/0068808 A1 | 3/2017 | Kaladgi et al. | | |
| 2017/0132842 A1* | 5/2017 | Morrison | ............. | G06T 19/006 |
| 2018/0232952 A1* | 8/2018 | Hiranandani | .......... | G06Q 10/00 |

OTHER PUBLICATIONS

Fingas, Jon, "Google's latest object recognition tech can spot everything in your living room," available online at <https://www.engadget.com/2014/09/08/google-details-object-recognition-tech/>, Sep. 8, 2017 (2 pages).

\* cited by examiner

AUGMENTED REALITY CAPTCHA

FIELD

The present disclosure relates to interfaces and, in particular, to a system, a computer program product, and method for determining whether an access request is made by a human.

BACKGROUND

A Completely Automated Public Turing test to tell Computers and Humans Apart ("Captcha") is a type of challenge-response test used in computing to determine whether or not a user is human. A captcha is a program or system intended to distinguish between human and machine input to prevent robots or other non-human interactors to access network locations, such as webpages. Captchas are often used as a way of thwarting spam and automated extraction of data from websites.

SUMMARY

Aspects of the embodiments are directed to a method for authorizing a user to access a network location, the method including receiving an indication that a user is attempting to access the network location; receiving a streaming image feed from a camera associated with a device being used by the user to attempt to access the network location; determining from the streaming image feed an environment in which the user is located; determining from the environment, an interactive image overlay; augmenting the streaming image feed with the interactive image overlay; receiving an augmented image feed from the camera, the augmented image feed comprising imagery of the user interacting with the interactive image overlay; verifying that the user interaction with the interactive image overlay is a correct interaction for the interactive image overlay; and providing access to the user to the network location.

In some embodiments, the method can include after receiving the indication that the user is attempting to access the network location, activating the camera associated with the user device to begin the streaming image feed; and causing the device to transmit the streaming image feed to a web server managing the network location.

In some embodiments, the method can include, after receiving the streaming image feed, verifying that the streaming image feed is authentic.

In some embodiments, determining the interactive image overlay may include determining the interactive image overlay based on one or more of a time, date, location, or event information.

In some embodiments, the location, time, and date can be determined based on one or more of image metadata, time and date information stored on a server managing the network location, or time and date information associated with the location of the user.

In some embodiments, the event information is based at least on a determination of an event associated with the location, date, and time.

In some embodiments, the interactive image overlay includes an image that is relevant for the determined environment; and a prompt for the user to interact with the image.

In some embodiments, the prompt comprises instructions as to how the user can successfully interact with the image.

In some embodiments, verifying that the user interaction with the interactive image overlay is a correct interaction for the interactive image overlay includes processing the augmented streaming image feed using one or more of image processing, gesture recognition, hand movement recognition, or object recognition on the augmented streaming image feed; and using the processed augmented streaming image feed to determine that a user interaction conforms to a predetermined user interaction.

In some embodiments, verifying that the user interaction with the interactive image overlay is a correct interaction for the interactive image overlay includes receiving an indication of a gesture motion of the device; and determining that the gesture conforms to a gesture associated with the interactive image overlay determined for the environment.

Aspects of the embodiments can include a computer program product that includes a computer readable storage medium comprising computer readable program code embodied therewith, the computer readable program code for authorizing user access to a network location, the computer readable program code including computer readable program code configured to augment an image stream from a camera system on a user device with an augmentation; computer readable program code configured to receive, from the user device across the network, an augmented image stream that includes imagery of a user interacting virtually with the augmentation; computer readable program code configured to determine that the user virtual interaction with the augmentation is a correct virtual interaction for accessing the network location; and granting the user device access to the network location.

Some embodiments also include computer readable program code configured to activate a camera system on a user device from across a network; computer readable program code configured to receive the image stream from the user device across the network; and computer readable program code configured to determine the augmentation to the image stream based, at least in part on environmental data determined from the image stream.

Some embodiments also include computer readable program code configured to identify an environment in which the user device is located; and determine the augmentation to the image stream based at least in part on the identified environment.

Some embodiments can include computer program code configured to identify the environment based, at least in part, on a location of the user device, a date, a time, or an event.

Some embodiments can include computer readable program code configured to identify the environment based, at least in part, on image information recognized from the image stream.

Some embodiments can include computer program code configured to identify an image associated the determined environment; computer program code configured to identify a user virtual interaction with the image; and computer program code configured to transmit the image to the user device across the network.

Some embodiments can include computer readable program code configured to identify a prompt for the identified image and identified user virtual interaction, the prompt comprising an indication of how the user should interact with the image to access the network location.

Some embodiments can include computer program code configured to recognize a user virtual interaction with the augmentation; and computer program code configured to determine that the recognized user virtual interaction conforms to a predetermined interaction for accessing the network location.

Aspects of the embodiments are directed to a method performed on a user device that includes a camera system, the method including transmitting to a host server a request to access a network location; receiving, from the host server, an instruction to activate the camera system; transmitting to the host server a real-time image stream captured by the camera system; receiving, from the host server, an augmentation to the real-time image stream; displaying the augmentation on a display of the user device, the augmentation displayed with the real-time image stream; capturing a user interaction with the augmentation; transmitting the captured user interaction with the augmentation to the host server as an augmented real-time image stream; and receiving access to the network location.

Some embodiments can include receiving, with the augmentation, a prompt indicating how the user should interact with the augmentation; and displaying the prompt on the user device with the augmentation.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Commonly, captcha systems do not go beyond simple word distortion. The common type of captcha requires that the user type the letter of a distorted image, sometimes with the addition of an obscured sequence of letters or digits that appear on the screen. One of the key challenges in captcha design today is the level of difficulty of the test. Any complicated design that attempts to thwart character recognition software will also be difficult for humans to read. These systems often frustrate the user and can lock out a valid human user from appropriate databases.

Captcha requests protect websites from unauthorized bots. However, standard captcha requests can be easily broken with different attack techniques. Malicious bots with Optional Character Recognition (OCR) abilities can break through captcha protections. Additionally, a malicious user may use dictionary attacks to solve a captcha. A captcha dictionary is a record of all captcha images with which a server can challenge the user. Moreover, captcha farms comprise many employees continuously solving captchas and storing solutions in a database for later use by a malicious bot. Captcha image matching may be completed by reverse image searching. Because standard captchas may be easy to crack, captchas have grown in length and complexity. These convoluted captchas are difficult and inconvenient for a human user to solve.

Accordingly, there is a need in the marketplace for a client-friendly captcha system designed to improve usability and weed out automated malicious systems. The present disclosure provides a solution to overcome the weaknesses of traditional captcha protections. The present disclosure describes a captcha system that increases complexity of the captcha without increasing difficulty for a human user to complete. Embodiments of the present disclosure can address the above problems, and other problems, individually and collectively.

Figure 1:
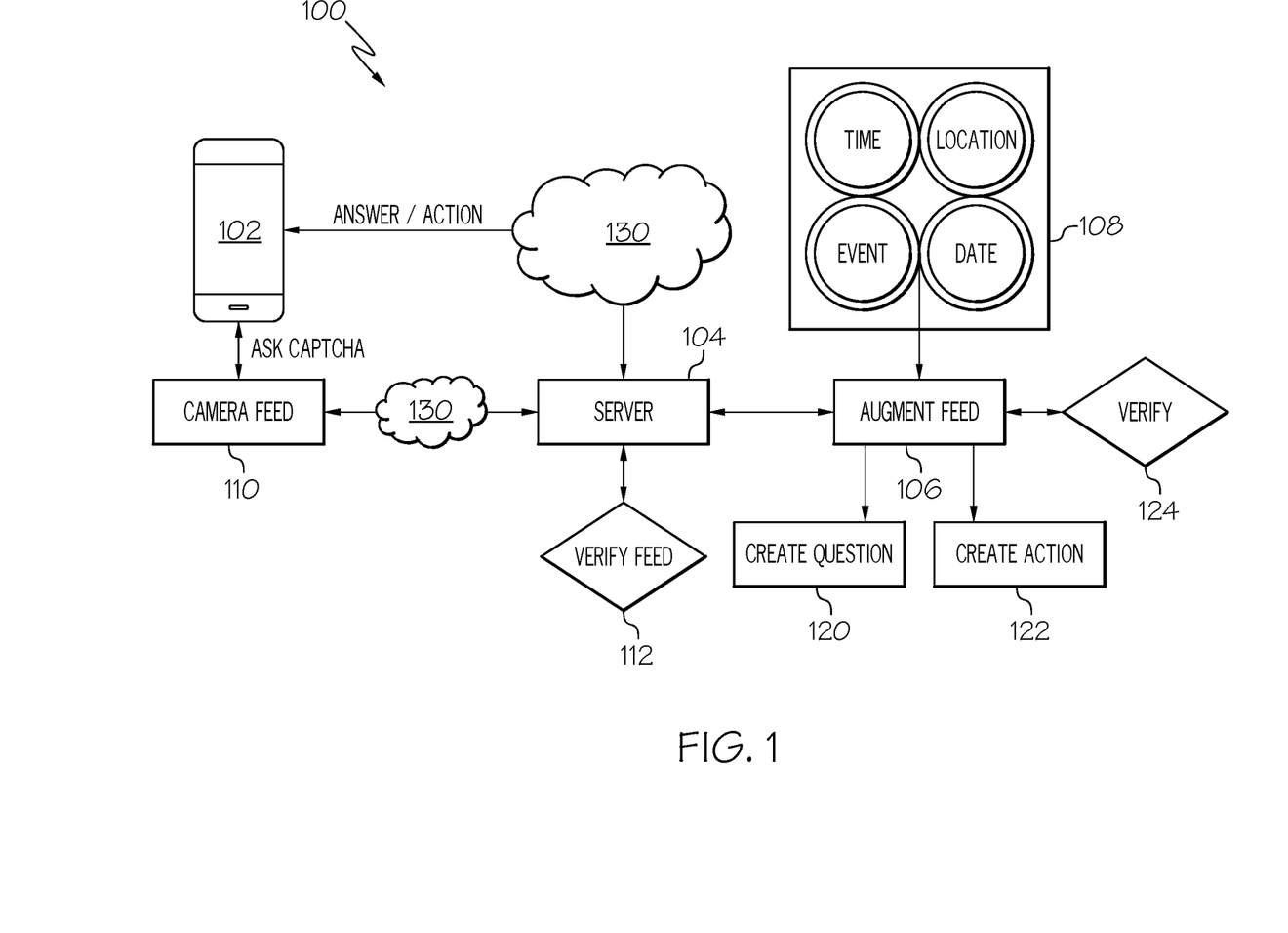
FIG. 1 is a schematic diagram of a system for providing an augmented reality captcha in accordance with embodiments of the present disclosure.

FIG. 1 is a schematic diagram of a system 100 for providing an augmented reality captcha in accordance with embodiments of the present disclosure. System 100 includes a mobile device 102, such as a mobile phone, tablet PC, smart phone, or other mobile device. Mobile device can include a camera or can control a camera separate from the mobile device. The mobile device 102 can receive streaming images or a camera feed 110 from the camera and transmit the camera feed 110 to a remote server 104 across a network connection 130, such as a Wifi connection, Internet connection, or cellular communications network connection. The mobile device 102 also includes a processor and a memory, as well as a radio transceiver for facilitating wireless communications across the network connection 110. The mobile device can provide an interface to facilitate access to a website or other web-based location. The interface can include an app or a browser or other known interface for viewing web content.

In embodiments, a user of the mobile device 10 can visit a website that requires a captcha verification prior to authorizing the user to visit other portions of the website. The host server 104 managing the website can receive an indication that the mobile device 102 is attempting to access website. The host server 104 can activate the camera on the mobile device 102 through the interface to start receiving the camera feed 110 by instructing the mobile device 102 to stream images to a remote server 104 across the network 130. The remote server 104 can be a server controlled by the website or can be a captcha server that provides captcha authorization services on behalf of the website.

The server 104 can receive the image feed 110 from the camera. The server 104 can include one or more algorithms for processing the received images, such as object recognition algorithms, hand tracking algorithms, other human-computer interaction (HCI) algorithms, gesture recognitions, etc. The algorithm(s) can determine information 108 about what the images show, such as the environment, the time, date, location, event information, etc. The server 104 can also receive metadata from the mobile device 102 that includes time, date, location, event information, etc. For example, the server 104 can receive GPS information indicating a location of the mobile device 102.

The server 104 can use that information 108 to determine a real-time virtual reality augmentation to the camera feed. The server 104 can also determine, based on the determined augmentation, a user interaction with the augmentation that can verify the user as a human to successfully traverse the captcha challenge. In FIG. 1, the creation or identification of an augmentation can be referred to as the creation of a question 120. The server 104 can create an action 122 corresponding to the question that if performed would successfully traverse the captcha challenge.

The server 104 can extract information 108 from the received stream of images, including metadata information included in the stream of information. The server 104 can also receive or otherwise acquire other information relating to the images, such as GPS information, radio triangulation information, event information, weather information, or other information that can be used to dynamically create an augmentation to the streaming images and a corresponding verification action. In embodiments, the algorithm can dynamically create an augmentation for the streaming images and store the dynamically created augmentation as a standard augmentation for similar environments.

In embodiments, the server 104 determine an environment based on the received images, and can select from a library, a standard augmentation for the environment. The library can be pre-populated or can be populated based on a dynamic determination of an augmentation from previously received environment information. The library can be associated with the server (e.g., stored at server or accessible by the server) or can be associated with an augmentation service 106 that is accessible by the server specifically for performing the creation/identification of VR augmentations for captcha, as well as the processing of received user interaction images to verify that the user is human (captcha successfully passed).

The server 104 can transmit the augmentation to the mobile device for display on the screen, e.g., through a camera or camera application. The augmentation will be displayed to the user on the mobile device screen as a real time augmented reality image overlaid on the streaming images. The server 104 can also prompt the user to interact with the augmentation to traverse the captcha challenge.

In embodiments, the server 104 can access an augmentation server 106. Augmentation service 106 can be a remote server that houses data and algorithms for creating, identifying, and processing virtual reality augmentations. The server 104 can provide information 108 to the augmentation service 106 so that augmentation service 106 can provide an augmentation that is contextually relevant to a user experience.

In embodiments, the server 104 can use a verification service 112 to verify that the camera feed as being either a valid feed or a dummy feed. The server 104 or the augmentation service 106 can use a verification service 124 to verify that the virtual interaction with the virtual reality augmentation passes the captcha challenge.

At the outset, a user operating a mobile device can use a software-based website interface to access a website. The website can requires a captcha verification prior to authorizing the user to visit other portions of the website. The server can access the mobile device camera. The server can cause the camera to activate and to begin streaming image data to the server. The server can process the received image stream to determine environment, time, date, location, etc. The server can identify and/or create an augmentation based on the determined environment. The server can provide the augmentation to the mobile device by overlaying the augmentation on to the image stream. The server can also determine a user interaction that if performed will successfully pass the captcha challenge. The user can perform the interaction, which becomes part of the image stream that is sent to the server. The server can process the image stream that includes the user interaction to determine whether the user has passed the captcha challenge. If the user passes the captcha challenge, then the server can authorize further access to the website. If the user does not pass the captcha challenge, the server can resend the augmentation or can identify a different augmentation for the user to try.

In embodiments, the server 104 can perform a verification 112 to verify that the image stream is real or is a dummy feed. For example, each camera feed frame received by the server 104 can include a device fingerprint embedded in the frame (e.g., a unique identifier for the mobile device). This unique ID can be compared against the mobile device trying to log in to the website to determine whether camera feed frame is from same device or not. In addition to the device ID, a timestamp can also be embedded in each camera feed frame to determine the timestamp of that camera feed frame. The server 104 can use this timestamp to determine the whether the feed is live or real-time (or as close to live/real-time as possible), as opposed to an old recording. Also to prevent tampering of above values, such as by a hacker trying to change the device ID and timestamp from camera feed frame, each camera feed frame can be signed by the device using some trusted authorities signing certificate (e.g., in a manner similar to secure sockets layer (SSL) techniques).

In some embodiments, the server 104 can rely on an augmented reality service 106 for identifying an augmentation and verifying that the augmentation is interacted with correctly for passing the captcha challenge. For example, the augmented reality service 106 can be one or more algorithms stored locally on server 104, or the augmented reality service 106 can be a remote service accessed by the server 104 across a network. The augmented reality service 106 can utilize one or more algorithms to create and/or identify an augmentation based on information 108 as well as information learned by the augmentation service from images in the camera feed 110. Algorithms can include HCI, hand tracking, gesture recognition, object recognition, etc., to determine a contextually relevant augmentation based on what is being captured and displayed by the camera on the mobile device 102. Information 108 can also be used to further refine the contextual relevancy of the augmentation created or identified for the captcha challenge.

The augmentation service 106 can also use hand tracking, gesture recognition and/or object recognition, as well as other techniques, to verify that the user virtual interaction with the augmentation is acceptable to pass the captcha challenge. The augmentation service 106 can receive the augmented camera feed that includes imagery of the user interacting with the augmentation. The augmentation service 106 can use algorithms, such as those above, to recognize hand motions or gestures, and to determine whether the hand motions and/or gestures conform to a predetermined user action that would pass the captcha challenge. The user action can be determined when the augmentation service 106 determines the augmentation.

Figure 2:
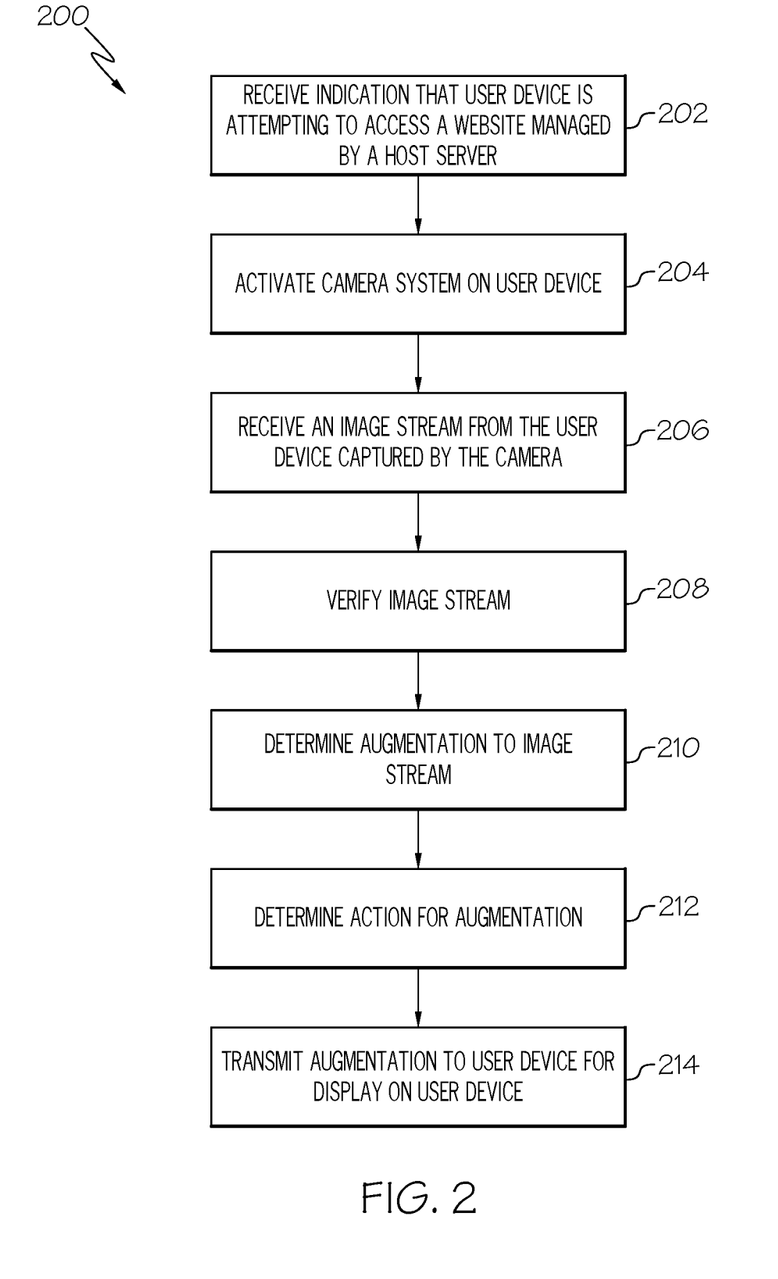
FIG. 2 is a process flow diagram for a server to provide an augmented reality captcha to a user device in accordance with embodiments of the present disclosure.

FIG. 2 is a process flow diagram 200 for a server to provide an augmented reality captcha to a user device in accordance with embodiments of the present disclosure. The server can receive an indication that user device is attempting to access a website managed by a host server (202). The server can cause the user device to activate camera system on user device (204). The server can receive an image stream from the user device captured by the camera (206). The server can use a verification system to verify that the image stream is real, as opposed to a dummy stream (208). The server (or an augmentation service) can determine an augmentation to image stream (210), the augmentation being an image or set of images that augment the camera feed of the user device. The augmentation (or VR augmentation) can represent a captcha challenge, and when interacted with, virtually, the VR augmentation can allow the user to access the website. The server or augmentation service can determine a corresponding action for augmentation, the action if performed would pass the captcha challenge (212). Transmit augmentation to user device for display on user device (214).

Figure 3:
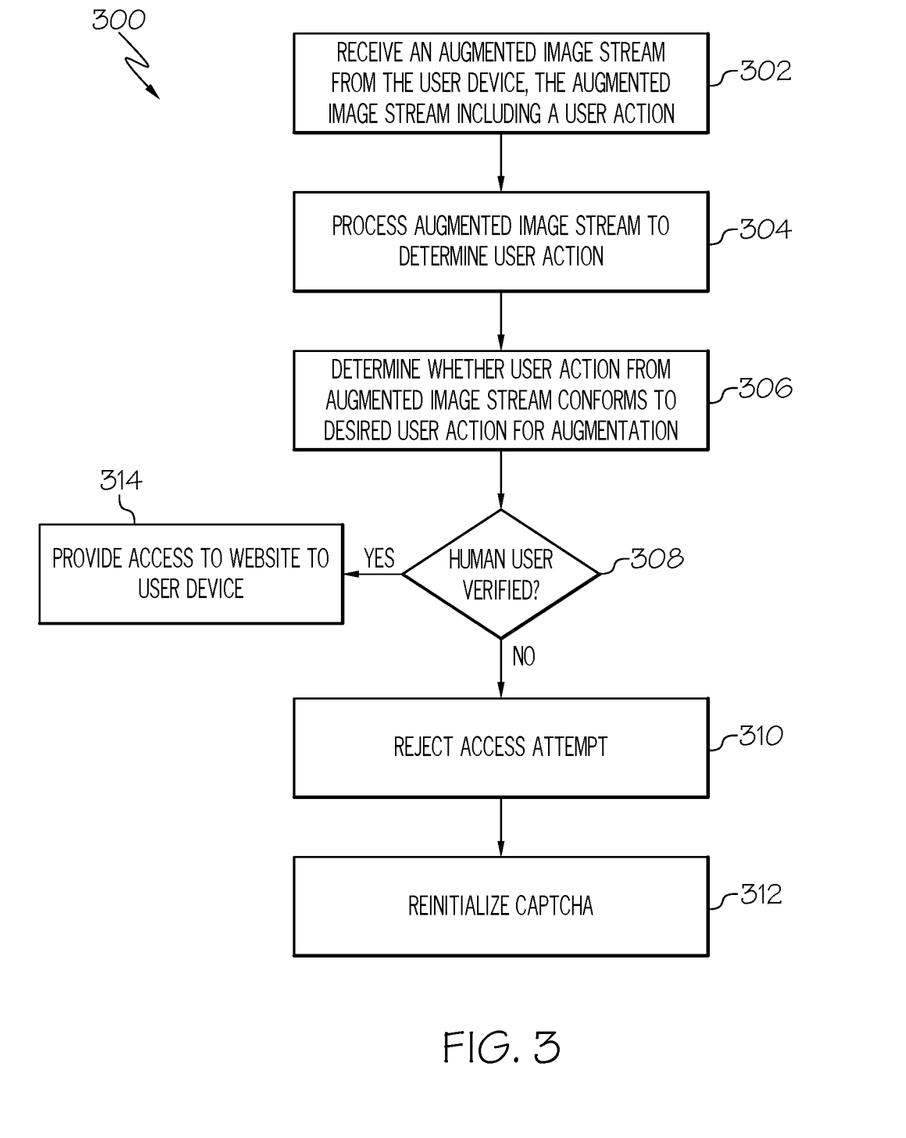
FIG. 3 is a process flow diagram for a server to process an image stream of a user interacting virtually with an augmented reality captcha in accordance with embodiments of the present disclosure.

FIG. 3 is a process flow diagram 300 for a server to process an image stream of a user interacting virtually with an augmented reality captcha in accordance with embodiments of the present disclosure. The server can receive an augmented image stream from the user device, the augmented image stream including a captured user action (302). The server or augmentation service can process the augmented image stream to determine what the user action was (304). For example, the server or augmentation service can use hand tracking algorithms, object recognition, gesture recognition, or other algorithms to determine a user interaction. The server or augmentation service can determine whether the user action from augmented image stream conforms to a desired user action for augmentation (306). That is, did the user perform the correct action (308)? If the user is verified as a human, then the server can provide the user with access to website (314). If the user is not verified as human, the server can reject the user device's attempt to access the website (310), and the server can reinitialize the captcha (e.g., with a new augmentation, a different augmentation, or without using the VR augmentation at all, and presenting a type-written captcha) (312).

Figure 4:
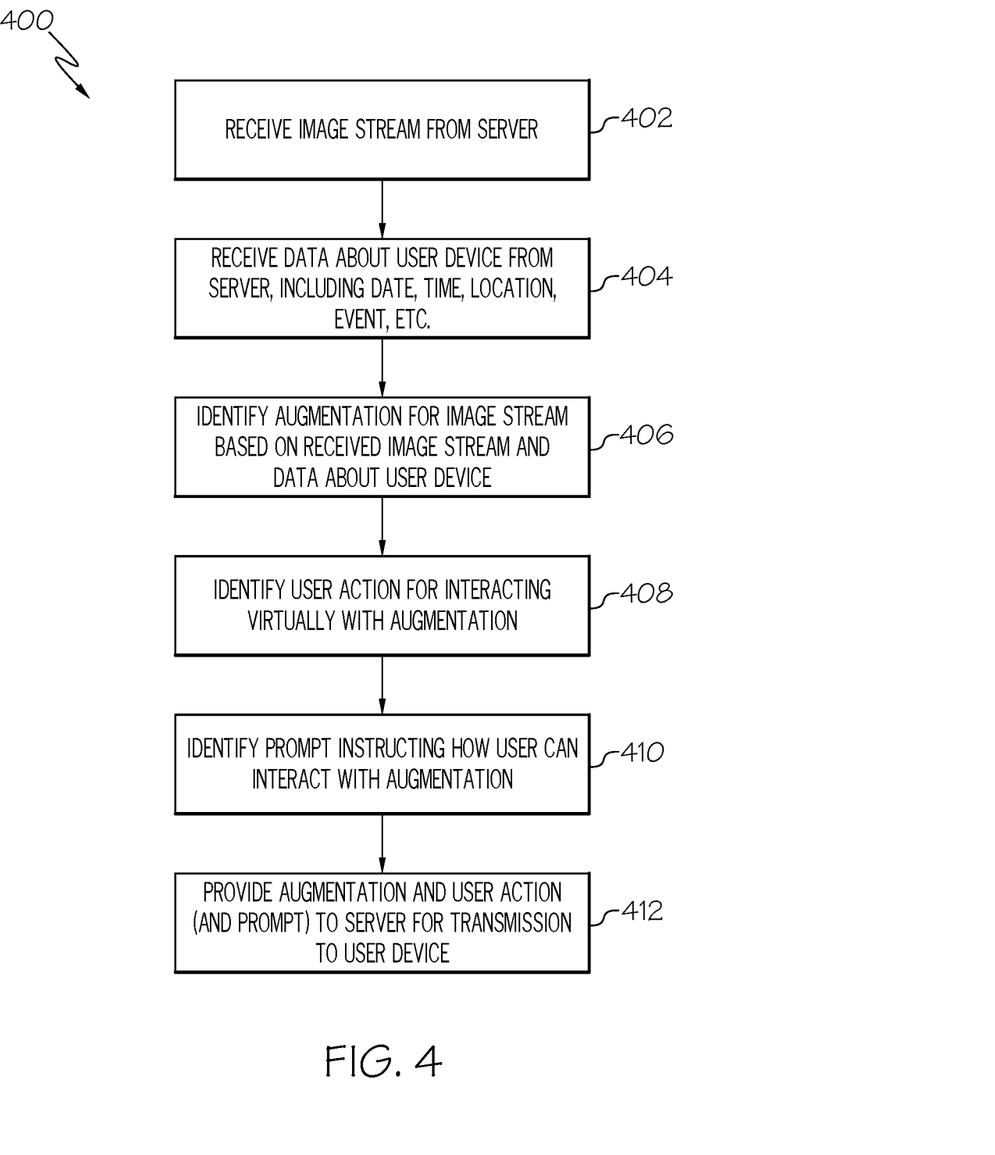
FIG. 4 is a process flow diagram for an augmentation service to identify an augmentation for an image stream in accordance with embodiments of the present disclosure.

FIG. 4 is a process flow diagram 400 for an augmentation service to identify an augmentation for an image stream in accordance with embodiments of the present disclosure. The augmentation service can receive an image stream from the server (402). The augmentation service can also receive data about user device from server, including date, time, location, event, GPS, inertial measurement unit information, etc. (404). The augmentation service can identify or create a virtual reality (VR) augmentation for the image stream based on received image stream and data about user device (406). The VR augmentation can be added to the image stream for display to the user by the server, as mentioned above. The augmentation service can identify a user action for interacting virtually with augmentation (408). The augmentation service can identify a prompt instructing how user can interact with augmentation (410). The augmentation service can provide the augmentation and user action (and prompt) to the server for transmission to user device (412).

Figure 5:
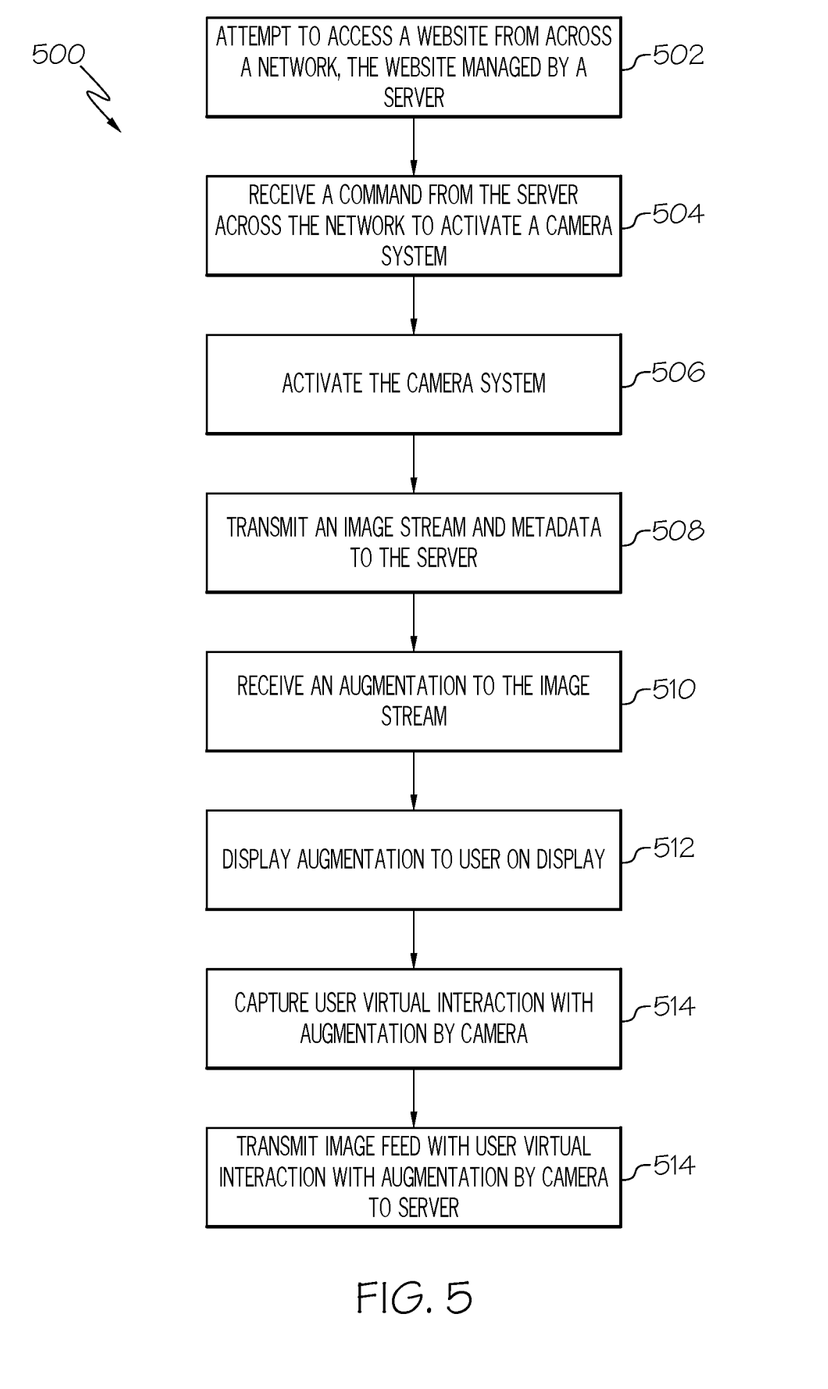
FIG. 5 is a process flow diagram for a user device to display an augmented reality captcha in accordance with embodiments of the present disclosure.

FIG. 5 is a process flow diagram 500 for a user device to display an augmented reality captcha in accordance with embodiments of the present disclosure. A user can use the user device to attempt to access a website from across a network, the website managed by a server (502). The user device can receive a command from the server across the network to activate a camera system on the user device (504). The user device can activate the camera system (506). Upon activating the camera system, the camera system begins displaying a stream of images. The user device can transmit an image stream, image metadata, and other information to the server (508). For example, the user device can transmit GPS information, date, time, location, events, phone position information (e.g., based on accelerometer, IMU, etc.). The user device can receive a VR augmentation to the image stream from the server (510). The user device can display the VR augmentation with the image stream to the user on a display screen (512). In embodiments, the VR augmentation can include a prompt, instructing the user how to interact with the VR augmentation to successfully pass the captcha challenge. The user device, by the camera system, can capture user virtual interaction with augmentation by camera (514). The user device can transmit the image stream that includes a images of the user virtual interaction with the augmentation to server (516).

Figure 6A:
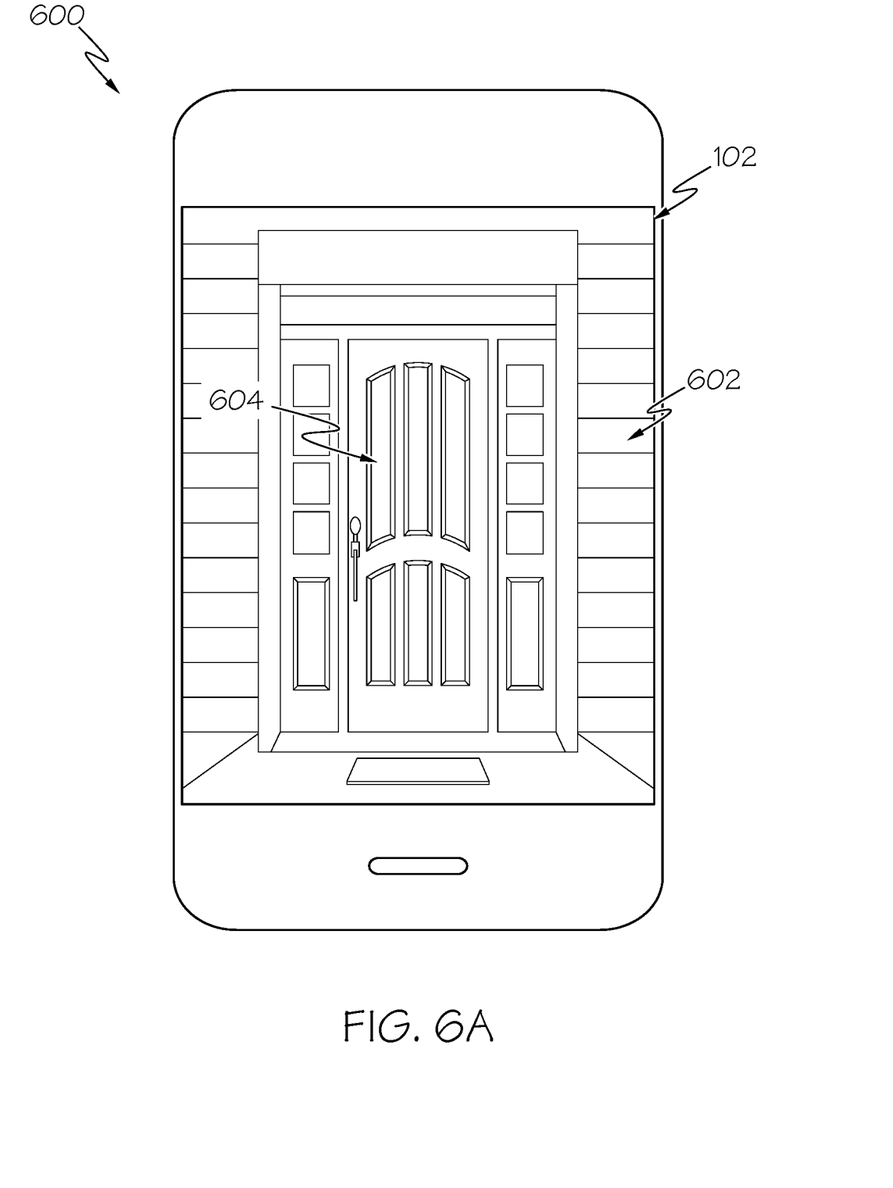
FIGS. 6A-6D are schematic diagrams of a user device displaying an augmented reality captcha in accordance with embodiments of the present disclosure.

FIGS. 6A-6D are schematic diagrams of a user device displaying an augmented reality captcha in accordance with embodiments of the present disclosure. FIG. 6A is a schematic diagram 600 illustrating the display of an image stream 602 in accordance with embodiments of the present disclosure. In FIG. 6A, the mobile device 102 has a camera that is activated, and has started displaying a captured image stream 602 on a display of the mobile device 102. The image stream 602 is made up of a plurality of captured images displayed at a certain display rate. The image stream 602 in this non-limiting example is an image stream of a doorway 604.

Figure 6B:
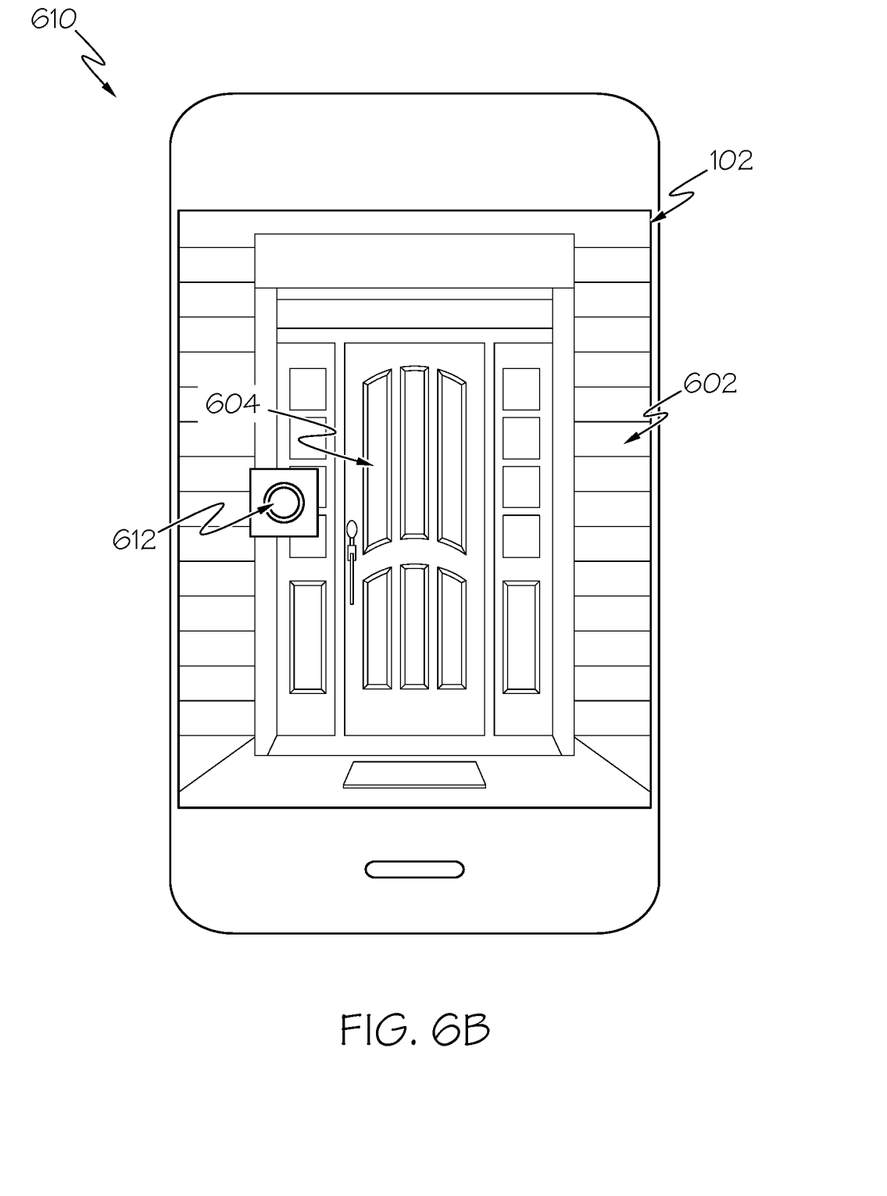

FIG. 6B is a schematic diagram 610 of an augmented image stream showing a VR augmentation 612 with the image stream 602 in accordance with embodiments of the present disclosure. In FIG. 6B, the server and augmentation service have determined that the image stream 602 includes a door 604. The server and augmentation service create or identify that a doorbell 612 is a contextually relevant VR augmentation to an image stream 602 that includes a door 604.

Figure 6C:
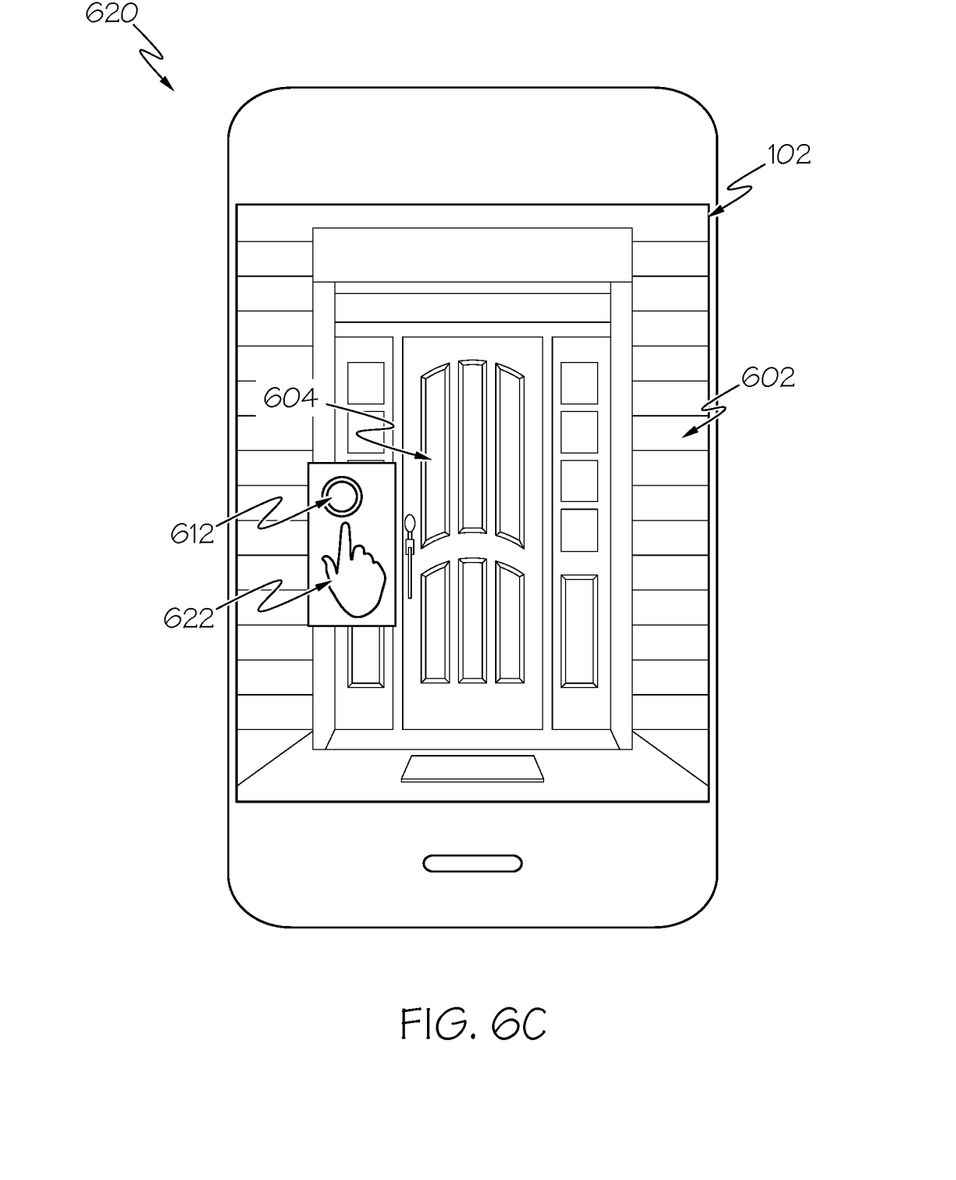
Figure 6D:
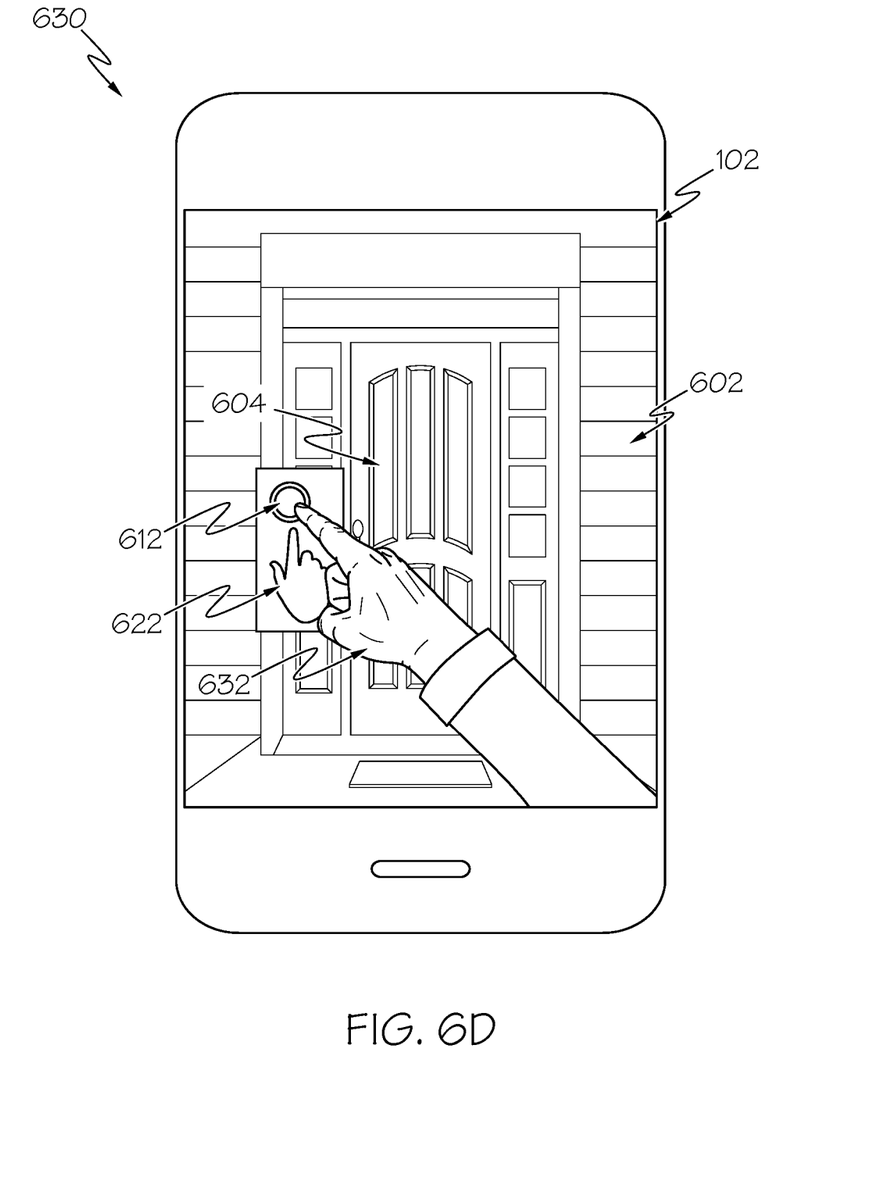

FIG. 6C is a schematic diagram 620 of an augmented image stream showing a VR augmentation 612 and a prompt 622 with the image stream 602 in accordance with embodiments of the present disclosure. The prompt 622 can be a static image or can include animations that illustrate how the user can interact with the doorbell 612.

FIG. 6C is a schematic diagram 620 of an augmented image stream showing a VR augmentation 612 and a prompt 622 with the image stream 602 and an image stream of a user interacting virtually with the VR augmentation 612 in accordance with embodiments of the present disclosure. The captured image stream that includes the user interaction 632 (here, pressing the doorbell) can be transmitted to the server, augmentation service, captcha service, or other verification service, to verify that the user interaction 632 passes the captcha challenge.

The camera will record the user's hand moving into a certain position in the camera frame. The positon of the user's hand, the orientation of the user's hand (e.g., finger extended), the motion of the user's hand, etc., can be used by the augmentation service to determine that the user is making a motion in a correct location relative to the augmentation to pass the captcha challenge.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method for authorizing a user to access a network location, the method comprising:
    receiving an indication that a user is attempting to access the network location;
    receiving a streaming image feed from a camera associated with a device being used by the user to attempt to access the network location;
    determining from the streaming image feed an environment in which the user is located;
    determining from the environment, an interactive image overlay;
    augmenting the streaming image feed with the interactive image overlay;
    receiving an augmented image feed from the camera, the augmented image feed comprising image data indicating that the user is interacting virtually with the interactive image overlay;
    verifying that the user interaction with the interactive image overlay is a correct interaction for the interactive image overlay for passing a challenge-response test; and
    providing access to the user to the network location.

2. The method of claim 1, further comprising:
    after receiving the indication that the user is attempting to access the network location, activating the camera associated with the user device to begin the streaming image feed; and
    causing the device to transmit the streaming image feed to a web server managing the network location.

3. The method of claim 1, further comprising:
    after receiving the streaming image feed, verifying that the streaming image feed is authentic.

4. The method of claim 1, wherein determining the interactive image overlay comprises:
    determining the interactive image overlay based on one or more of a time, date, location, or event information.

5. The method of claim 4, wherein the location, time, and date can be determined based on one or more of image metadata, time and date information stored on a server managing the network location, or time and date information associated with the location of the user.

6. The method of claim 4, wherein the event information is based at least on a determination of an event associated with the location, date, and time.

7. The method of claim 1, wherein the interactive image overlay comprises:
    an image that is relevant for the determined environment; and
    a prompt for the user to interact with the image.

8. The method of claim 7, wherein the prompt comprises instructions as to how the user can successfully interact with the image.

9. The method of claim 1, wherein verifying that the user interaction with the interactive image overlay is a correct interaction for the interactive image overlay comprises processing the augmented streaming image feed using one or more of image processing, gesture recognition, hand movement recognition, or object recognition on the augmented streaming image feed; and
    using the processed augmented streaming image feed to determine that a user interaction conforms to a predetermined user interaction.

10. The method of claim 1, wherein verifying that the user interaction with the interactive image overlay is a correct interaction for the interactive image overlay comprises:
    receiving an indication of a gesture motion of the device; and
    determining that the gesture conforms to a gesture associated with the interactive image overlay determined for the environment.

11. A method performed on a user device that includes a camera system, the method comprising:
    transmitting to a host server a request to access a network location;
    receiving, from the host server, an instruction to activate the camera system;
    transmitting to the host server a real-time image stream captured by the camera system;
    receiving, from the host server, an augmentation to the real-time image stream;
    displaying the augmentation on a display of the user device, the augmentation displayed with the real-time image stream as part of a challenge-response test;
    capturing a user interaction with the augmentation as a user response to the challenge-response test;
    transmitting the captured user interaction with the augmentation to the host server as an augmented real-time image stream for processing the user response to the challenge-response test; and
    receiving access to the network location when the response to the challenge-response test is correct.

12. The method of claim 11, further comprising:
    receiving, with the augmentation, a prompt indicating how the user should interact with the augmentation; and
    displaying the prompt on the user device with the augmentation.

13. A non-transitory computer-readable medium having program instructions stored therein, wherein the program instructions are executable by a computer system to perform operations comprising:
    receiving an indication that a user is attempting to access the network location;
    receiving a streaming image feed from a camera associated with a device being used by the user to attempt to access the network location;
    determining from the streaming image feed an environment in which the user is located;
    determining from the environment, an interactive image overlay;
    augmenting the streaming image feed with the interactive image overlay;
    receiving an augmented image feed from the camera, the augmented image feed comprising image data indicating that the user is interacting virtually with the interactive image overlay;

verifying that the user interaction with the interactive image overlay is a correct interaction for the interactive image overlay for passing a challenge-response test; and providing access to the user to the network location.

14. The non-transitory computer-readable medium of claim 13, the operations further comprising:
after receiving the indication that the user is attempting to access the network location, activating the camera associated with the user device to begin the streaming image feed; and
causing the device to transmit the streaming image feed to a web server managing the network location.

15. The non-transitory computer-readable medium of claim 14, the operations further comprising:
after receiving the streaming image feed, verifying that the streaming image feed is authentic.

16. The non-transitory computer-readable medium of claim 13, the operations further comprising:
determining the interactive image overlay based on one or more of a time, date, location, or event information.

17. The non-transitory computer-readable medium of claim 16, wherein the location, time, and date can be determined based on one or more of image metadata, time and date information stored on a server managing the network location, or time and date information associated with the location of the user.

18. The non-transitory computer-readable medium of claim 16, wherein the event information is based at least on a determination of an event associated with the location, date, and time.

19. The non-transitory computer-readable medium of claim 13, wherein the interactive image overlay comprises:
an image that is relevant for the determined environment; and
a prompt for the user to interact with the image.

20. The non-transitory computer-readable medium of claim 19, wherein the prompt comprises instructions as to how the user can successfully interact with the image.

21. The non-transitory computer-readable medium of claim 13, wherein verifying that the user interaction with the interactive image overlay is a correct interaction for the interactive image overlay comprises processing the augmented streaming image feed using one or more of image processing, gesture recognition, hand movement recognition, or object recognition on the augmented streaming image feed; and
using the processed augmented streaming image feed to determine that a user interaction conforms to a predetermined user interaction.

22. The non-transitory computer-readable medium of claim 13, wherein verifying that the user interaction with the interactive image overlay is a correct interaction for the interactive image overlay comprises:
receiving an indication of a gesture motion of the device; and
determining that the gesture conforms to a gesture associated with the interactive image overlay determined for the environment.

* * * * *